United States Patent
Tabata et al.

(10) Patent No.: US 8,636,304 B2
(45) Date of Patent: Jan. 28, 2014

(54) WEBBING-THREADING MEMBER AND SEATBELT DEVICE

(75) Inventors: Yuuki Tabata, Tokyo (JP); Hideaki Nakagawa, Tokyo (JP); Ryoichi Imai, Tokyo (JP)

(73) Assignee: Takata Corporation, Tokyo (JP)

( * ) Notice: Subject to any disclaimer, the term of this patent is extended or adjusted under 35 U.S.C. 154(b) by 117 days.

(21) Appl. No.: 13/379,637

(22) PCT Filed: May 27, 2010

(86) PCT No.: PCT/JP2010/058965
§ 371 (c)(1),
(2), (4) Date: Dec. 20, 2011

(87) PCT Pub. No.: WO2010/150617
PCT Pub. Date: Dec. 29, 2010

(65) Prior Publication Data
US 2012/0091781 A1    Apr. 19, 2012

(30) Foreign Application Priority Data

Jun. 23, 2009 (JP) ................................. 2009-149166

(51) Int. Cl.
*B60R 22/34* (2006.01)
(52) U.S. Cl.
USPC ........ 280/807; 280/801.1; 280/808; 297/474; 297/483; 297/486
(58) Field of Classification Search
USPC ........... 280/801.1, 801.2, 802, 803, 806–808; 297/468, 472, 474–476, 478, 482, 483, 297/486; 242/613.2, 615.3
See application file for complete search history.

(56) References Cited

U.S. PATENT DOCUMENTS

| | | | |
|---|---|---|---|
| 6,739,625 B2 * | 5/2004 | Tomita et al. | 280/808 |
| 7,201,400 B2 * | 4/2007 | Hattori | 280/801.1 |
| 7,325,835 B2 * | 2/2008 | Janz | 280/801.1 |
| 7,578,525 B2 | 8/2009 | You | |

(Continued)

FOREIGN PATENT DOCUMENTS

| | | |
|---|---|---|
| JP | 10-166998 A | 6/1998 |
| JP | 2002-127869 A | 5/2002 |

(Continued)

OTHER PUBLICATIONS

Search Report mailed Jun. 22, 2010 in International Application No. PCT/JP2010/058965.

*Primary Examiner* — Paul N Dickson
*Assistant Examiner* — Darlene P Condra
(74) *Attorney, Agent, or Firm* — Foley & Lardner LLP

(57) ABSTRACT

Provided are a webbing-threading member and a seatbelt device that can prevent deviation of webbing (a so-called jamming phenomenon) by preventing rotation of the webbing-threading member. A webbing-threading member 1 of the present invention includes a body 2 rotatably mounted on the side of a vehicle, a threading hole 3 formed in the body 2 for guiding the webbing W, and a guide piece 4 placed on a surface of the threading hole 3 and forming a sliding surface 41 over which the webbing W slides. The guide piece 4 has, on the sliding surface 41, engaging grooves 42 that cause a pressing force to act in such a direction as to rotate the body 2 toward a vehicle front side at the time of withdrawing the webbing W, and that cause a pressing force to act in such a direction as to rotate the body 2 toward a vehicle rear side at the time of retracting the webbing W.

7 Claims, 7 Drawing Sheets

(56) References Cited

U.S. PATENT DOCUMENTS

| | | | |
|---|---|---|---|
| 7,591,512 B2* | 9/2009 | You | 297/482 |
| 7,600,786 B2* | 10/2009 | You | 280/808 |
| 7,832,769 B2* | 11/2010 | Gleason et al. | 280/808 |
| 2006/0022507 A1* | 2/2006 | You | 297/463.1 |
| 2007/0040372 A1* | 2/2007 | Tabata et al. | 280/801.1 |
| 2007/0138783 A1* | 6/2007 | Gleason et al. | 280/808 |
| 2007/0273138 A1* | 11/2007 | You | 280/801.1 |

FOREIGN PATENT DOCUMENTS

| | | |
|---|---|---|
| JP | 2002-337658 A | 11/2002 |
| JP | 2003-072514 A | 3/2003 |
| JP | 2003-089345 A | 3/2003 |
| JP | 2004-122894 A | 4/2004 |
| JP | 2004-338477 A | 12/2004 |
| JP | 2006-036186 A | 2/2006 |
| WO | WO-2008/135143 A2 | 11/2008 |

* cited by examiner

FIG. 1
FIG. 1(A)
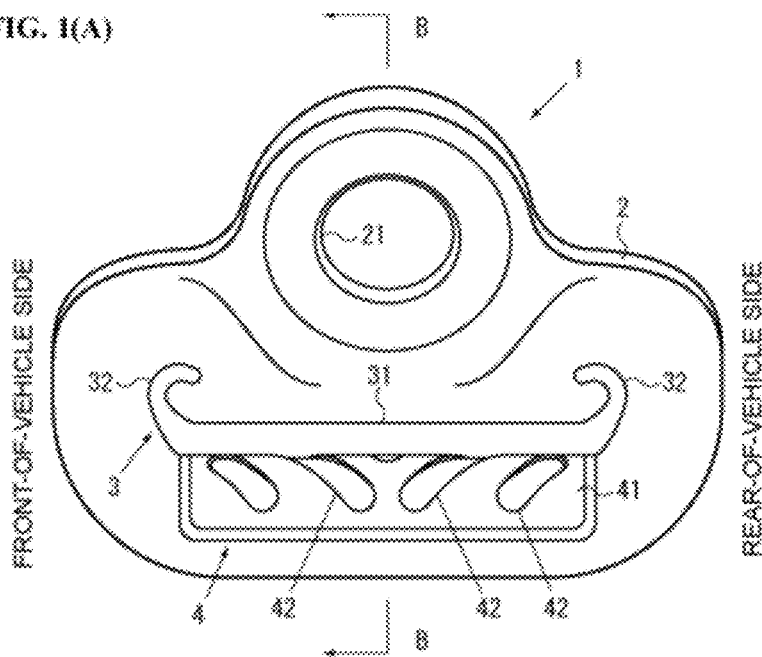
FIG. 1(B)
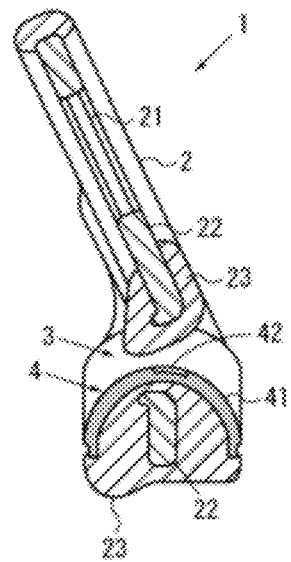

FIG. 2(A) Driver Seat

FIG. 2(B) Passenger Seat

FIG. 3
FIG. 3(A)
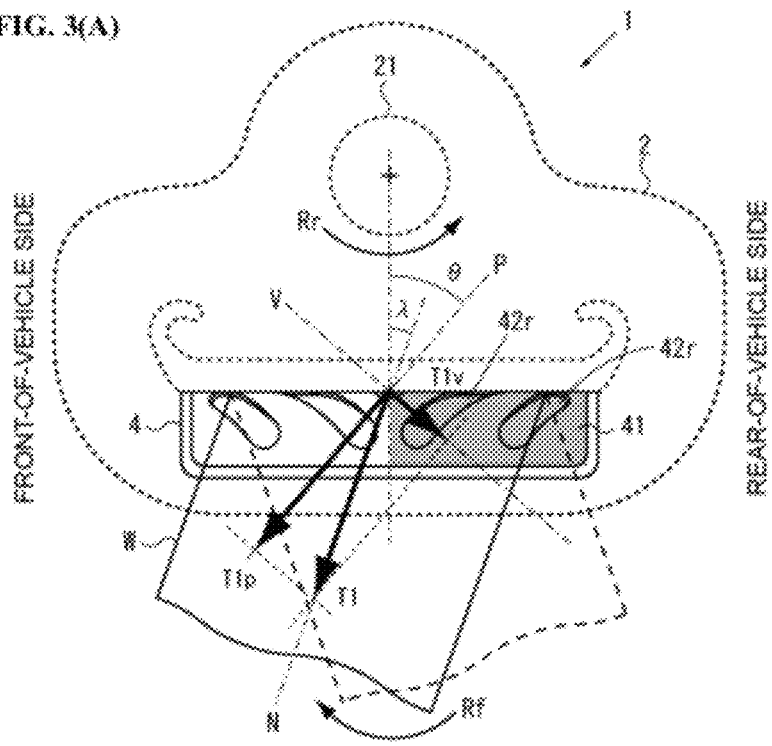
FIG. 3(B)
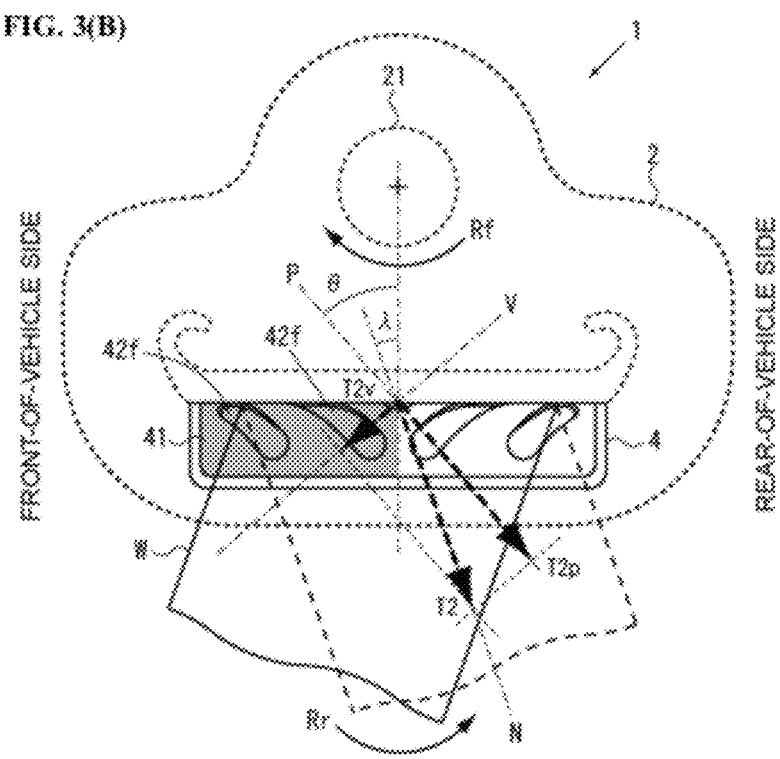

FIG. 4
FIG. 4(A)
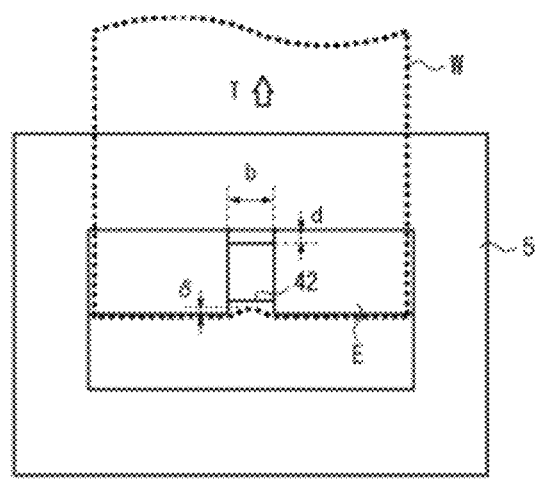
FIG. 4(B)
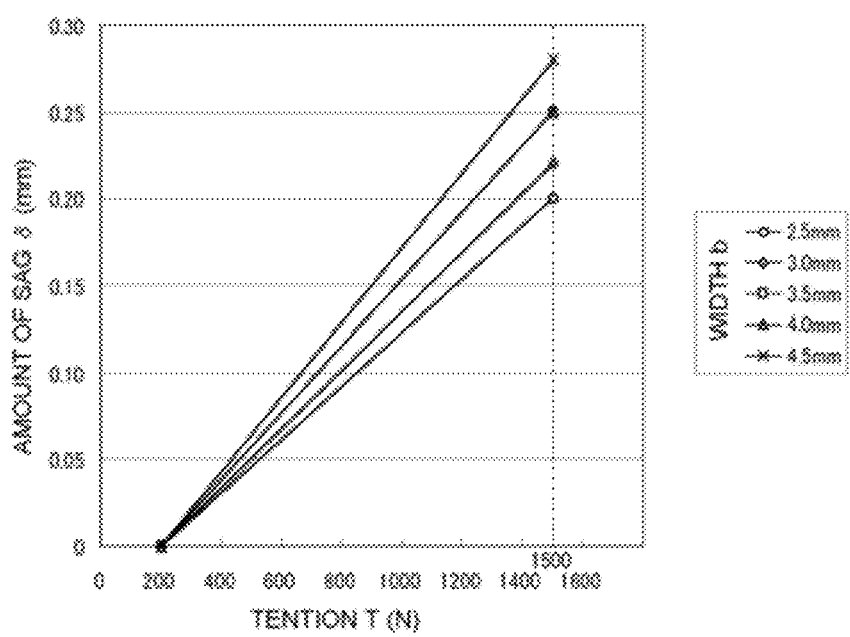
FIG. 4(C)

FIG. 5
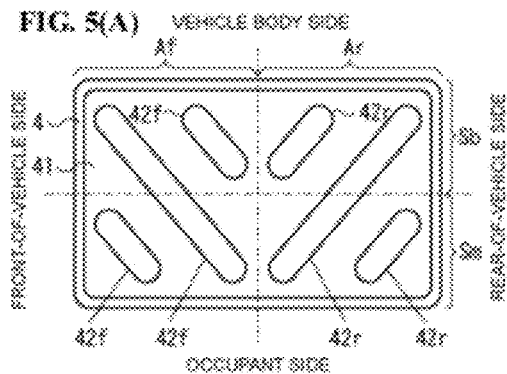
FIG. 5(A)
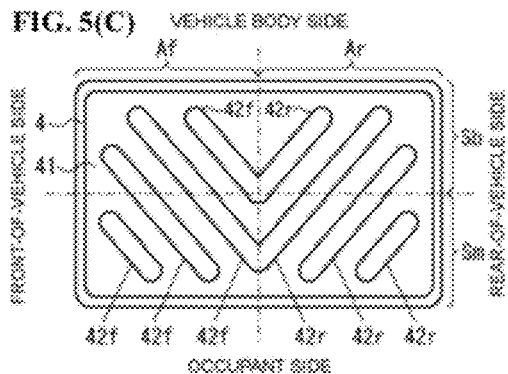
FIG. 5(C)
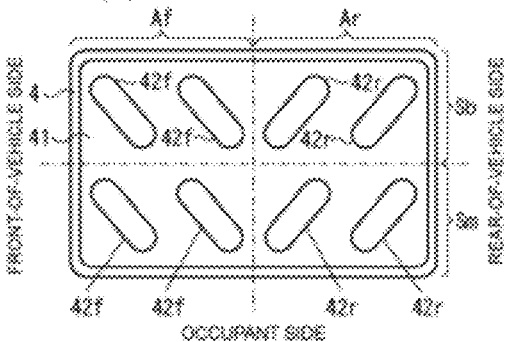
FIG. 5(B)
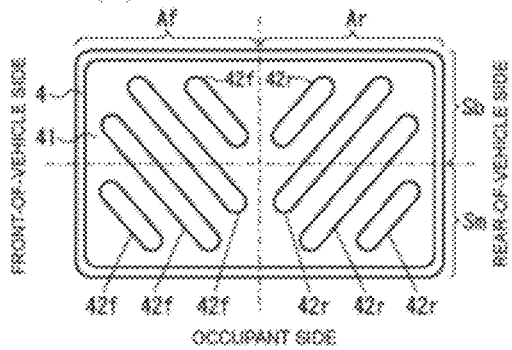
FIG. 5(D)
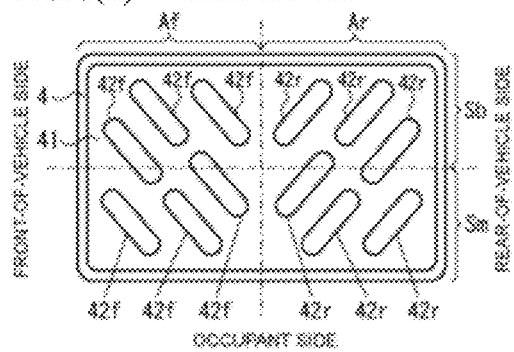
FIG. 5(E)

FIG. 6
FIG. 6(A)
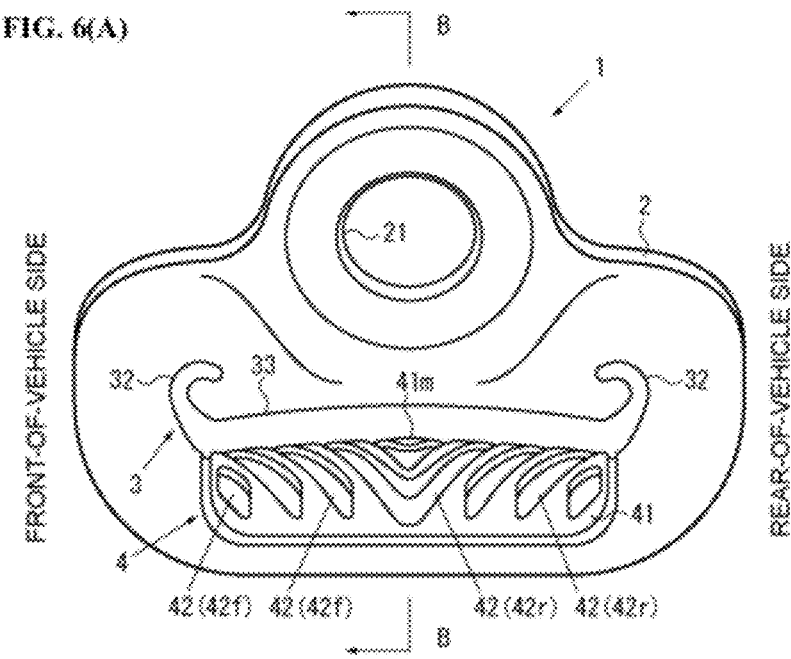
FIG. 6(B)
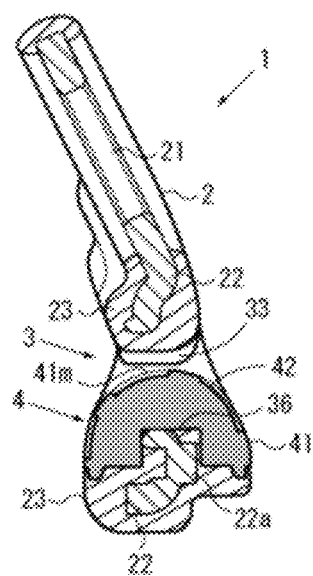

WEBBING-THREADING MEMBER AND SEATBELT DEVICE

TECHNICAL FIELD

The present invention relates to webbing-threading members and seatbelt devices that are employed in vehicles such as automobiles, and particularly to a webbing-threading member and a seatbelt device that can prevent deviation of webbing.

BACKGROUND ART

A vehicle, such as an automobile, is generally equipped with a seatbelt device for restraining an occupant in a seat that includes a seat portion on which the occupant is seated and a backrest portion located to the rear of the occupant. Such a seatbelt device includes webbing used to restrain an occupant in a seat, a retractor for retracting the webbing, a guide anchor (webbing-threading member) mounted on a vehicle body for guiding the webbing, a belt anchor for fixing the webbing to the vehicle body, a buckle disposed on a side surface of the seat, and a tongue through which the webbing passes. An occupant is restrained by fitting the tongue into the buckle. In this seatbelt device, one end of the webbing is fixed to the belt anchor and another end of the webbing is thread through the guide anchor and joined to the refractor. Thus, at the time of withdrawing or retracting the webbing, the webbing is always in contact with and slides over the guide anchor.

At the time when a large load acting toward the front side of the vehicle is applied to an occupant, such as when a vehicle crashes or decelerates suddenly, the above guide anchor may cause a phenomenon in which the webbing is deviated toward the front side of the vehicle (what is called being jammed). As disclosed in PTL 1 to PTL 3, for example, some devices have been proposed as measures to prevent such a phenomenon. In each of the devices, a metal guide piece having certain grooves or recesses and projections is placed on a portion over which the webbing slides.

Here, a webbing-threading member described in PTL 1 has a recessed-and-projecting region that is only formed on a vehicle body side or on or around a top portion of a guide piece. A webbing-threading member described in PTL 2 is obtained by grinding recesses and projections formed on a surface of a guide piece to thus smooth the recesses and projections and reduce the frictional resistance. A webbing-threading member described in PTL 3 is obtained by forming, on a vehicle front side of a guide piece, grooves that extend in a direction in which the webbing extends when worn and that are curved toward the rear side of the vehicle.

CITATION LIST

Patent Literature

PTL 1: Japanese Unexamined Patent Application Publication No. 2002-127869
PTL 2: Japanese Unexamined Patent Application Publication No. 2004-122894
PTL 3: Japanese Unexamined Patent Application Publication No. 2004-338477

SUMMARY OF INVENTION

Technical Problem

At the time when the webbing is deviated toward the front side of the vehicle, such as when the vehicle crashes or decelerates suddenly, a webbing-threading member is inclined so as to be rotated toward the rear side of the vehicle. If the webbing-threading member is rotated toward the rear side of the vehicle, the webbing is further deviated toward the front side of the vehicle. Thus, in order to prevent deviation (a so-called jamming phenomenon) of the webbing, it is effective to prevent rotation of the webbing-threading member.

However, in the case where the recessed-and-projecting region is formed only on a vehicle body side or on or around a top portion of a guide piece, as in the case of the webbing-threading member described in PTL 1, the resistance force that occurs between the webbing and the guide piece is not large enough to prevent rotation of the webbing-threading member.

Further, in the case where the recesses and projections are ground down and smoothed, as in the case of the webbing-threading member described in PTL 2, it is difficult for the webbing to be engaged with the grooves (dents) of the recesses and the projections since the corners of the recesses and the projections are rounded off. Thus, the resistance force that occurs between the webbing and the guide piece is not so large, and therefore it is difficult to prevent rotation of the webbing-threading member.

Furthermore, in the case where the grooves are formed with the front-of-the-vehicle side of the guide piece being focused upon, as in the case of the webbing-threading member described in PTL 3, part of the webbing on the rear side of the vehicle cannot be prevented from sideslipping (from moving toward the front side of the vehicle). Thus, it is difficult to prevent rotation of the webbing-threading member. In contrast, considering that "the case where the load is concentrated on the front side of the vehicle" means "a state where the webbing-threading member is rotated", the invention described in PTL 3 lacks the very concept of preventing the rotation of the webbing-threading member.

The present invention is made in view of the above problems, and an object of the present invention is to provide a webbing-threading member and a seatbelt device that can prevent deviation (a so-called jamming phenomenon) of webbing by preventing rotation of the webbing-threading member.

Solution to Problem

According to the present invention, there is provided a webbing-threading member for guiding webbing used for restraining an occupant of a vehicle. The webbing-threading member includes a body rotatably mounted on the side of the vehicle, a threading hole formed in the body for guiding the webbing, and a guide piece placed on a surface of the threading hole and forming a sliding surface over which the webbing slides. The guide piece has, on the sliding surface, engaging grooves that cause a force to act in such a direction as to rotate the body toward a vehicle front side at the time of withdrawing the webbing, and that cause a force to act in such a direction as to rotate the body toward a vehicle rear side at the time of retracting the webbing.

According to the present invention, there is provided is a seatbelt device that includes webbing used for restraining an occupant in a seat, a retractor for retracting the webbing, a guide anchor mounted on a vehicle body for guiding the webbing, a belt anchor for fixing the webbing to the vehicle body, a buckle disposed on a side surface of the seat, and a tongue through which the webbing passes, the seatbelt device restraining the occupant when the tongue is fitted into the buckle. The guide piece has, on the sliding surface, engaging grooves that cause a force to act in such a direction as to rotate the body toward a vehicle front side at the time of withdrawing the webbing, and that cause a force to act in such a direction as to rotate the body toward a vehicle rear side at the time of retracting the webbing.

In the webbing-threading member and the seatbelt device described above, it is preferable that the engaging grooves include rear engaging grooves formed in a vehicle-rear-side region of the guide piece and front engaging grooves formed in a vehicle-front-side region of the guide piece, that the rear engaging grooves function at the time of withdrawing the webbing, and that the front engaging grooves function while the webbing is retracted.

The rear engaging grooves may extend from a vehicle-body-side surface to an occupant-side surface in a direction from a vehicle rear side toward a vehicle front side, and the direction in which the rear engaging grooves are formed may be set in such a manner that the rear engaging grooves form a larger angle with a center line of the guide piece than a direction in which the webbing is guided does. It is preferable that the front engaging grooves be formed to be mirror symmetric to the rear engaging grooves.

The engaging grooves may be set to have such a width that the webbing sags in the engaging grooves and thus the engaging grooves and the webbing are engaged with each other. For example, the width is set to be within a range of 2.5 to 4.5 mm, or more preferably set to be within a range of 3.0 to 4.5 mm.

The sliding surface of the guide piece may be formed into a shape that protrudes with respect to a vehicle front-rear direction.

Advantageous Effects of Invention

With the above-described webbing-threading member and seatbelt device according to the present invention, by forming the guide piece so as to include engaging grooves that cause a predetermined pressing force to be generated, rotation of the webbing-threading member can be prevented. Thus, deviation (a so-called jamming phenomenon) of webbing can be prevented.

In addition, by forming the engaging grooves so as to include the rear engaging grooves and the front engaging grooves, a pressing force can be effectively generated at the time of withdrawing or retracting webbing. Further, by forming the engaging grooves (the rear engaging grooves and the front engaging grooves) in a predetermined direction, webbing can be more easily engaged with the engaging grooves and thus a pressing force can be effectively generated. Furthermore, by forming the rear engaging grooves and the front engaging grooves to be mirror symmetric to each other, the same components can be used for, for example, a webbing-threading member for a driver seat and a webbing-threading member for a passenger seat, and the cost can thus be reduced. Moreover, by setting the engaging grooves to a predetermined width, the webbing can be engaged by being made to sag in the engaging grooves and thus a pressing force can be effectively generated.

By forming the sliding surface of the guide piece into a protruding shape, a pressing force can be effectively generated, the webbing can be more easily engaged with the engaging groove, and deviation (a so-called jamming phenomenon) of the webbing can be further prevented.

BRIEF DESCRIPTION OF DRAWINGS

FIG. 1 is a view illustrating a webbing-threading member according to an embodiment of the present invention, in which FIG. 1(A) is a front view of the webbing-threading member and FIG. 1(B) is a sectional view of the webbing-threading member taken along line B-B of FIG. 1(A).

FIG. 2 is a developed plan view of a guide piece, in which FIG. 2(A) illustrates a guide piece for use in a webbing-threading member disposed on a driver seat side and FIG. 2(B) illustrates a guide piece for use in a webbing-threading member disposed on a passenger seat side.

FIG. 3 is a view illustrating operations of engaging grooves, in which FIG. 3(A) illustrates the operation at the time of withdrawing the webbing and FIG. 3(B) illustrates the operation at the time of retracting the webbing.

FIG. 4 is a view illustrating the relationship between the width of each engaging groove and the amount of sag of the webbing, in which FIG. 4(A) illustrates a testing device, FIG. 4(B) shows test results, and FIG. 4(C) shows the relationship between the number of engaging grooves and the amount of sag of the webbing.

FIG. 5 is a view illustrating modified examples of engaging grooves, in which FIG. 5(A) illustrates engaging grooves according to a first modified example, FIG. 5(B) illustrates engaging grooves according to a second modified example, FIG. 5(C) illustrates engaging grooves according to a third modified example, FIG. 5(D) illustrates engaging grooves according to a fourth modified example, and FIG. 5(E) illustrates engaging grooves according to a fifth modified example.

FIG. 6 is a view illustrating a webbing-threading member according to another embodiment of the present invention, in which FIG. 6(A) is a front view of the webbing-threading member and FIG. 6(B) is a sectional view of the webbing-threading member taken along line B-B of FIG. 6(A).

DESCRIPTION OF EMBODIMENTS

Figure 2:
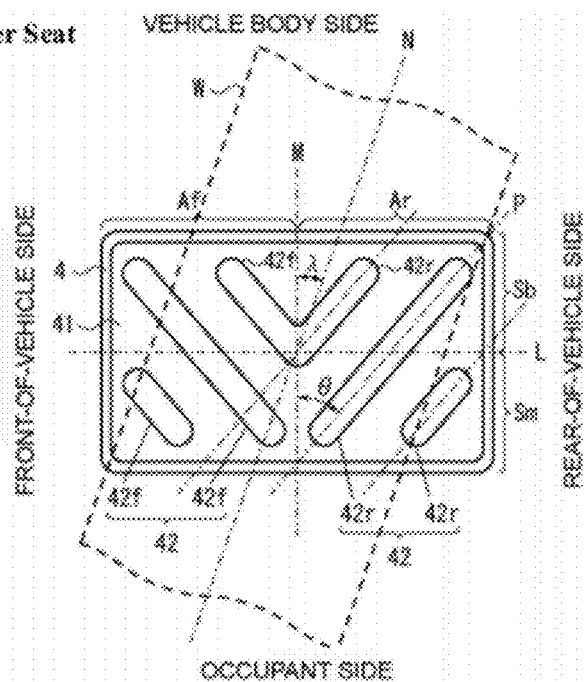
Figure 2:
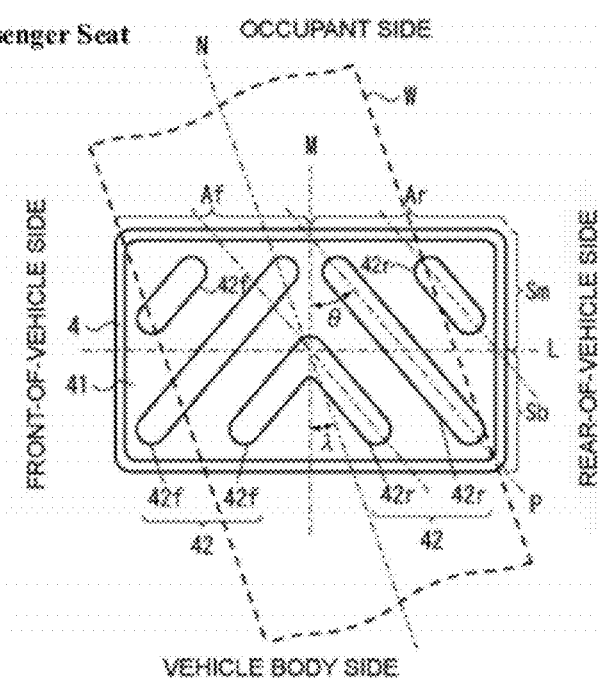

Referring to FIGS. 1-7, embodiments of the present invention will be described below. Here, FIG. 1 is a view illustrating a webbing-threading member 1 according to an embodiment of the present invention, in which FIG. 1(A) is a front view of the webbing-threading member and FIG. 1(B) is a sectional view of the webbing-threading member taken along line B-B of FIG. 1(A). The front view here is a view that illustrates the webbing-threading member 1 seen from the viewpoint of an occupant when the webbing-threading member 1 is mounted on a vehicle body.

The webbing-threading member 1 according to the present invention, which is illustrated in FIGS. 1(A) and 1(B), is a component that guides webbing W used for restraining an occupant of a vehicle. The webbing-threading member 1 includes a body 2 rotatably mounted on the side of a vehicle, a threading hole 3 formed in the body 2 for guiding the webbing W, and a guide piece 4 placed on a surface of the threading hole 3 and forming a sliding surface 41 over which the webbing W slides. The guide piece 4 has engaging grooves 42 on the sliding surface 41. At the time of withdrawing the webbing W, the engaging grooves 42 cause a pressing force to act in such a direction as to rotate the body 2 toward the front side of the vehicle. At the time of retracting the webbing W, the engaging grooves 42 cause a pressing force to act in such a direction as to rotate the body 2 toward the rear side of the vehicle.

The body 2 is a component that defines the contours of the webbing-threading member 1. In addition to the above-described threading hole 3, the body 2 has an anchoring hole 21 used for rotatably mounting the webbing-threading member 1 on the vehicle body (B-pillar, for example) of the vehicle. The entire shape of the body 2 is determined by molding a synthetic resin 23 after the guide piece 4 has been placed on a core 22 made of, for example, a metal or resin plate.

The threading hole 3 is an opening portion that allows the webbing W to be thread therethrough. The threading hole 3 includes a straight portion 31 for guiding the webbing W and relief portions 32 located on both sides of the straight portion 31 and communicating therewith. The main purpose of the straight portion 31 is to smoothly guide the webbing W at the time of withdrawing or retracting the webbing W. The main purpose of the relief portions 32 is to prevent the webbing W from becoming folded over at the time of sideslip or deviation of the webbing W. The relief portions 32 function upon, for example, the occurrence of a load that is too large for the webbing-threading member 1 according to the present invention to prevent deviation of the webbing W.

The guide piece 4 is a component that has the sliding surface 41 for allowing the webbing W to smoothly slide thereover. The guide piece 4 is formed in the shape of a side surface portion of a semi-cylindrical component. The guide piece 4 is disposed in such a manner that the axial direction of the guide piece 4 coincides with the straight portion 31 of the threading hole 3. The outer surface of the semi-cylindrical component forms the sliding surface 41. The guide piece 4 is fixed to the body 2 by, for example, molding the synthetic resin 23 while the guide piece 4 is connected to the core 22 of the body 2, or is fixed to the body 2 by being fastened, by a fastening device such as a bolt or screw, to the synthetic resin 23 that has been molded so as to cover the core 22. It is preferable that the guide piece 4 be made of a low-friction material such as a resin or a metal since the guide piece 4 is required to be wear-resistant and slippery. Instead, the sliding surface 41 of the guide piece 4 may be coated with a fluoroplastic or a ceramic material or plated with nickel or chromium so that the guide piece 4 can have improved wear resistance and slippliness.

The guide piece 4 according to the present invention is characterized in that the sliding surface 41 has the engaging grooves 42 that can cause a pressing force to act in such a direction as to rotate the body 2 toward the front side of the vehicle at the time of withdrawing the webbing W, and that can cause a pressing force to act in such a direction as to rotate the body 2 toward the rear side of the vehicle at the time of retracting the webbing W.

Now, FIG. 2 is a developed plan view of the guide piece 4, in which FIG. 2(A) illustrates a guide piece 4 for use in the webbing-threading member 1 disposed on a driver seat side and FIG. 2(B) illustrates a guide piece 4 for use in the webbing-threading member 1 disposed on a passenger seat side. The developed plan view here is a view illustrating the guide piece 4, which is a semi-circular component, being developed on a flat plate. In each of FIGS. 2(A) and 2(B), the webbing W is represented by dotted lines.

As illustrated in FIGS. 2(A) and 2(B), the engaging grooves 42 include rear engaging grooves 42r, which are formed in a rear region Ar located on the rear-of-the-vehicle side of the guide piece 4, and front engaging grooves 42f, which are formed in a front region Af located on the front-of-the-vehicle side of the guide piece 4. The rear region Ar and the front region Af are defined by a center line M dividing the guide piece 4 into two sections with respect to the vehicle front-rear direction.

The rear engaging grooves 42r extend from a vehicle-body-side surface Sb to an occupant-side surface Sm in a direction P from the rear side of the vehicle toward the front side of the vehicle. Here, a case where three rear engaging grooves 42r are arranged in parallel with one another is illustrated. Specifically, a long rear engaging groove 42r is formed substantially along the diagonal of the rear region Ar and short rear engaging grooves 42r are formed on both sides of the long rear engaging groove 42r. Here, the vehicle-body-side surface Sb and the occupant-side surface Sm are defined by an axis L of the guide piece 4.

The direction P of each rear engaging groove 42r is set in such a manner that the rear engaging groove 42r forms a larger angle $\theta$ with the center line M of the guide piece 4 than a direction N in which the webbing W is guided does. Here, the rear engaging grooves 42r are formed in such a manner that the relationship $\theta > \lambda$ is satisfied, where $\lambda$ denotes an angle formed by the center line M of the guide piece 4 with the direction N in which the webbing W is guided.

On the other hand, each front engaging groove 42f is formed in a shape that is the inverse of the corresponding rear engaging groove 42r about the center line M of the guide piece 4. That is, the front engaging grooves 42f are mirror symmetric to the rear engaging grooves 42r with respect to the center line M of the guide piece 4. By forming the rear engaging grooves 42r and the front engaging grooves 42f so as to be mirror symmetric to each other, the same components can be used for the webbing-threading member 1 for the driver seat and the webbing-threading member 1 for the passenger seat. Thus, the cost can be reduced. If, as illustrated, there are a rear engaging groove 42r and a front engaging groove 42f that intersect at the center line M, the rear engaging groove 42r and the front engaging groove 42f may be connected to each other so as to be substantially V-shaped.

Here, operations of the engaging grooves 42 will be described by using the webbing-threading member 1 that is disposed on the driver seat side and that includes the guide piece 4 illustrated in FIG. 2(A). FIG. 3 is a view illustrating operations of the engaging grooves 42, in which FIG. 3(A) illustrates the operation at the time of withdrawing the webbing and FIG. 3(B) illustrates the operation at the time of retracting the webbing. In each of FIGS. 3(A) and 3(B), the outline of the webbing W on the occupant side is represented by solid lines, and the outline of the webbing W on the vehicle body side is represented by dotted lines. For convenience of illustration, each of FIGS. 3(A) and 3(B) illustrates a state where the webbing W is illustrated in a transparent manner. Also, for convenience of illustration, the outline of the webbing-threading member 1 is represented by dotted lines.

At the time of withdrawing the webbing W, the webbing W is pulled by a tension T1 toward the front side of the vehicle in the guiding direction N as illustrated in FIG. 3(A). The tension T1 can be divided into a component of a direction P in which the engaging grooves 42 are formed, and a component of a direction V that is perpendicular to the direction P. The P-direction component is denoted by T1$p$ and the V-direction component is denoted by T1$v$. Focusing now on the rear region Ar (shaded part) of the guide piece 4, the V-direction component T1$v$ of the tension T1 acts in a direction V that is perpendicular to the direction P in which the engaging grooves 42 are formed. Thus, when the rear engaging grooves 42r and the webbing W are engaged with each other, a force that presses the webbing-threading member 1 downward, i.e., a force to act in such a direction (Rf direction in the drawing) as to rotate the webbing-threading member 1 toward the front side of the vehicle can be generated. In addition, by forming the angle $\theta$ formed by the center line M with the direction P in which the rear engaging grooves 42r so as to be larger than the angle $\lambda$ formed by the center line M with the direction N in which the webbing W is guided, the V-direction component T1$v$ of the tension T1 can be applied effectively.

It is generally known that, at the time of withdrawing the webbing W, the webbing-threading member 1 is rotated toward the rear side of the vehicle (in the Rr direction in the drawing). When the webbing-threading member 1 is rotated toward the rear side of the vehicle, the webbing W is likely deviated toward the front side of the vehicle. Thus, in the present invention, by engaging the webbing W and the rear engaging grooves 42*r*, a force is generated that acts in such a direction as to rotate the webbing-threading member 1 toward the front side of the vehicle (in the Rf direction in the drawing). Thus, the webbing-threading member 1 is prevented from being rotated toward the rear side of the vehicle.

On the other hand, at the time of retracting the webbing W, the webbing W is pulled by a tension T2 toward the rear side of the vehicle in the guiding direction N as illustrated in FIG. 3(B). The tension T2 can be divided into a component of a direction P in which the engaging grooves 42 are formed, and a component of a direction V that is perpendicular to the direction P. The P-direction component is denoted by T2*p* and the V-direction component is denoted by T2*v*. Focusing now on the front region Af (shaded part) of the guide piece 4, the V-direction component T2*v* of the tension T2 acts in the direction V that is perpendicular to the direction P in which the engaging grooves 42 are formed. Thus, when the front engaging grooves 42*f* and the webbing W are engaged with each other, a force that presses the webbing-threading member 1 downward, i.e., a force to act in such a direction (Rr direction in the drawing) as to rotate the webbing-threading member 1 toward the rear side of the vehicle can be generated. In addition, since the angle θ formed by the center line M with the direction P in which the front engaging grooves 42*f* are formed is larger than the angle λ formed by the center line M with the direction N in which the webbing W is guided, the V-direction component T1*v* of the tension T1 can be applied effectively.

It is generally known that, at the time of retracting the webbing W, the webbing-threading member 1 is rotated toward the front side of the vehicle (in the Rf direction in the drawing). When the webbing-threading member 1 is rotated toward the front side of the vehicle, the webbing W is likely deviated toward the rear side of the vehicle. Thus, in the present invention, by engaging the webbing W and the front engaging grooves 42*f*, a force is generated that acts in such a direction as to rotate the webbing-threading member 1 toward the rear side of the vehicle (in the Rr direction in the drawing). Thus, the webbing-threading member 1 is prevented from being rotated toward the front side of the vehicle.

As described above, in the present invention, not the frictional force caused between the webbing W and the sliding surface 41, but the pressing force caused by engaging the webbing W and the engaging grooves 42 is utilized. Thus, the webbing W and the engaging grooves 42 need to be engaged efficiently. Here, FIG. 4 is a view illustrating the relationship between the width b of each engaging groove 42 and the amount of sag δ of the webbing W, in which FIG. 4(A) illustrates a testing device, FIG. 4(B) shows test results, and FIG. 4(C) shows the relationship between the number of engaging grooves 42 and the amount of sag δ of the webbing W.

In order for the webbing W and the engaging grooves 42 to be efficiently engaged with each other, the width b is preferably set to such a value that the webbing W sags in the engaging grooves 42 and thus the engaging grooves 42 and the webbing W are engaged with each other. More specifically, it is preferable that the webbing W be caused to sag in the engaging grooves 42 and the sagging portions be hooked on edge portions of the engaging grooves 42. Here, if the width b of each engaging groove 42 is too small, the webbing W will have a small amount of sag δ, whereas if the width b of each engaging groove 42 is too large, the sagging portions of the webbing W will come into contact with bottom portions of the engaging grooves 42 and thus will not be engaged with the edge portions tightly. For this reason, the relationship between the width b of each engaging groove 42 and the amount of sag δ of the webbing W was examined by use of the testing device illustrated in FIG. 4(A).

In the testing device illustrated in FIG. 4(A), substantially stick-like specimens E, each of which serves as a portion of the webbing-threading member 1 on which the guide piece 4 is to be placed, are fixed to a rectangularly annular supporting member 5, and the webbing W is wound around each specimen E. A testing engaging groove 42 with a width b is circumferentially formed on the surface of each specimen E in a substantially center portion. The webbing W is guided in a direction that is substantially parallel to the direction in which the engaging groove 42 is formed. An edge portion of the engaging groove 42 has an angle of substantially 90° and the depth d of the engaging groove 42 is approximately 0.3 mm. Webbing that is normally used for a seatbelt device (of KES value 21) is used for the webbing W. Here, the KES value is a quantified number obtained by measuring basic mechanical properties of cloth, such as the tensile, shear, bending, compression, and surface properties.

The amount of sag δ (mm) of the webbing W in the engaging groove 42 was measured by fixing the supporting member 5 to a base, which is not illustrated, and concurrently pulling one end of the webbing W at a certain tension T (N) while another end was fixed. Here, the tension T was set to 1500 N on the basis of a load applied to the webbing W when a vehicle crashes. The above tests were conducted while the width b of the engaging groove 42 was varied within a range of 2.5 to 4.5 mm (2.5 mm, 3.0 mm, 3.5 mm, 4.0 mm, and 4.5 mm) and the test results illustrated in FIG. 4(B) were obtained. The reason why the upper limit of the width b of the engaging groove 42 was set to 4.5 mm is the following. Specifically, the width b was set to satisfy such a condition that the webbing W caused no sag (the amount of sag δ was zero) in order that the webbing W could smoothly slide over the guide piece 4 in a state where the seatbelt was normally worn, considering that the tension T applied to the webbing W was approximately 200 N in the state where the seatbelt was normally worn. However, the upper limit of the width b may be changed depending on various factors, such as types of the webbing W, vehicle types, layouts of a seatbelt device, and materials of the guide piece 4, and thus is not limited to 4.5 mm.

As illustrated in FIG. 4(B), the amount of sag δ of the webbing W at a tension T of 1500 N was 0.20 mm when the width b was 2.5 mm (circle mark in the drawing), 0.22 mm when the width b was 3.0 mm (diamond mark in the drawing), 0.25 mm when the width b was 3.5 mm (square mark in the drawing), 0.25 mm when the width b was 4.0 mm (triangle mark in the drawing), and 0.28 mm when the width b was 4.5 mm (cross mark in the drawing). The test results show that when the width b is smaller than 3.0 mm, the amount of sag δ is, for example, smaller than 0.2 mm, which is smaller than 0.22 mm, and thus the webbing W is not engaged tightly. Particularly, when the width b is smaller than 2.5 mm, the amount of sag δ is smaller than 0.20 mm. Thus, it is likely that the webbing W is engaged less tightly.

Further, when the multiple engaging grooves 42 are formed on the surface of the guide piece 4, more portions of the webbing W are engaged with the engaging grooves 42, and thus the magnitude of the pressing force is increased. The pressing force is proportional to the sum of the amounts of sag δ of the webbing W. Thus, with reference to FIG. 4(C), comparisons are made in relation to the relationship between the number of engaging grooves 42 and the sum of the amounts of sag δ of the webbing W.

As illustrated in FIG. 4(C), the sum of the amounts of sag δ is 0.56 mm in the case where there are two engaging grooves 42 with the width b of 4.5 mm, in each of which the webbing W sags with the largest amount of sag δ; the sum of the amounts of sag δ is 0.66 mm in the case where there are three engaging grooves 42 with the width b of 3.0 mm, in each of which the webbing sags with a smaller amount of sag δ; the sum of the amounts of sag Δ is 0.60 mm in the case where there are three engaging grooves 42 with the width b of 2.5 mm, in each of which the webbing sags with the smallest amount of sag δ. Thus, it is preferable to form three engaging grooves 42 with the width b of 3.0 mm or 2.5 mm rather than to form two engaging grooves 42 with the width b of 4.5 mm. From the test results, it is conceivable that a sum of the amounts of sag δ that is 0.6 mm or larger will suffice for the engagement and it is preferable that three or more engaging grooves 42 be formed in a predetermined region (the rear region Ar or the front region Af).

If the number of engaging grooves 42 is increased, the sum of the amounts of sag δ of the webbing W is increased. On the other hand, if a proportion of a portion of the predetermined region (the rear region Ar or the front region Af) that is occupied by the engaging grooves 42 is increased, the area of the sliding surface 41 of the webbing W is reduced. Thus, it is preferable that the areal proportion of a portion of the predetermined region (the rear region Ar or the front region Af) that is occupied by the engaging grooves 42 be 50% or lower, or more preferably 40% or lower. In view of the above, it is preferable that the number of engaging grooves 42 be set to around four, at most. Nevertheless, four or more engaging grooves 42 may be formed depending on the size of the guide piece 4 or the width of the engaging grooves 42.

The above-described test results show that the following settings are preferable: the width b of each engaging groove 42 be set within a range of 3.0 to 4.5 mm or within a range of 2.5 to 4.5 mm, the edge portion of each engaging groove 42 have an angle of approximately 90°, the depth d of each engaging groove 42 be 0.3 mm or larger, and about three or four engaging grooves 42 be formed in each region (the rear region Ar or the front region Af).

Next, modified examples of the engaging grooves 42 based on the above test results will be described. Now, FIG. 5 is a view illustrating modified examples of the engaging grooves 42, in which FIG. 5(A) illustrates engaging grooves according to a first modified example, FIG. 5(B) illustrates engaging grooves according to a second modified example, FIG. 5(C) illustrates engaging grooves according to a third modified example, FIG. 5(D) illustrates engaging grooves according to a fourth modified example, and FIG. 5(E) illustrates engaging grooves according to a fifth modified example. Components the same as those in the engaging grooves 42 illustrated in FIG. 2 are denoted by the same symbols and the redundant description thereof will not be given.

Engaging grooves 42 (front engaging grooves 42f and rear engaging grooves 42r) according to the first modified example illustrated in FIG. 5(A) are formed on the basis of the engaging grooves 42 (the front engaging grooves 42f and the rear engaging grooves 42r) illustrated in FIG. 2 in such a manner that the front engaging grooves 42f and the rear engaging grooves 42r do not intersect at the center line M. Specifically, a long rear engaging groove 42r is formed substantially along the diagonal of the rear region Ar and short rear engaging grooves 42r are formed on both sides of the long rear engaging groove 42r. All the rear engaging grooves 42r have such lengths as to not cross the center line M. The front engaging grooves 42f are formed in the front region Af so as to be mirror symmetric to the rear engaging grooves 42r with respect to the center line M. Also with such a structure, effects the same as those achieved by the embodiment illustrated in FIG. 2 are achieved.

Engaging grooves 42 (front engaging grooves 42f and rear engaging grooves 42r) according to the second modified example illustrated in FIG. 5(B) are formed on the basis of the engaging grooves 42 (the front engaging grooves 42f and the rear engaging grooves 42r) according to the first modified example illustrated in FIG. 5(A) in such a manner that the long front engaging groove 42f and the long rear engaging groove 42r formed substantially along the diagonals of the front region Af and the rear region Ar are each divided into two sections at a substantially center portion. Also with such a structure, effects the same as those achieved by the first modified example are achieved. Moreover, the engaging grooves 42 can have a uniform shape, the workability is improved, and the proportion of the area occupied by the engaging grooves 42 can be adjusted. Note that which of the engaging grooves 42 should be divided and the number of sections into which to divide each engaging groove 42 may be selected appropriately. For example, the short engaging grooves 42 may each be divided into two sections, or the long engaging grooves 42 may each be divided into three sections.

Engaging grooves 42 (front engaging grooves 42f and rear engaging grooves 42r) according to the third modified example illustrated in FIG. 5(C) are formed by reducing the width b of the engaging grooves 42 (the front engaging grooves 42f and the rear engaging grooves 42r) illustrated in FIG. 2 and by including four front engaging grooves 42f and four rear engaging grooves 42r. With such a structure, effects the same as those achieved by the embodiment illustrated in FIG. 2 are achieved. Moreover, the number of engaging grooves 42 can be increased.

Engaging grooves 42 (front engaging grooves 42f and rear engaging grooves 42r) according to the fourth modified example illustrated in FIG. 5(D) are formed on the basis of the engaging grooves according to the third modified example illustrated in FIG. 5(C) in such a manner that the front engaging grooves 42f and the rear engaging grooves 42r do not intersect at the center line M. Also with such a structure, effects the same as those achieved by the third modified example are achieved.

Engaging grooves 42 (front engaging grooves 42f and rear engaging grooves 42r) according to the fifth modified example illustrated in FIG. 5(E) are formed on the basis of the engaging grooves 42 (the front engaging grooves 42f and the rear engaging grooves 42r) according to the fourth modified example illustrated in FIG. 5(D) in such a manner that the long front engaging grooves 42f and the long rear engaging grooves 42r formed substantially along the diagonals of the front region Af and the rear region Ar are each divided into two sections at a substantially center portion. Also with such a structure, effects the same as those achieved by the fourth modified example are achieved. Moreover, the engaging grooves 42 can have the uniform shape, the workability is improved, and the proportion of the area occupied by the engaging grooves 42 can be adjusted. Note that each engaging groove 42 may be divided into any number of sections and which of the engaging grooves 42 should be divided may be selected appropriately.

Subsequently, a webbing-threading member 1 according to another embodiment of the present invention will be described. Here, FIG. 6 is a view illustrating a webbing-threading member according to another embodiment of the present invention, in which FIG. 6(A) is a front view of the webbing-threading member and FIG. 6(B) is a sectional view of the webbing-threading member taken along line B-B of FIG. 6(A). Components the same as those in the embodiment illustrated in FIG. 1 are denoted by the same symbols and redundant description thereof will not be given.

In this embodiment, the sliding surface 41 of the guide piece 4 is formed into a shape that protrudes with respect to the front-rear direction of the vehicle, as illustrated in FIG. 6(A). Specifically, a bulging surface 41m is formed on the sliding surface 41 in such a manner that a center portion, in the vehicle front-rear direction, of the guide piece 4 rises toward the anchoring hole 21. The protruding surface of the bulging surface 41m is formed so as to have, for example, a substantially uniform curvature. The engaging grooves 42 are formed on the sliding surface 41 that has the bulging surface 41m. The engaging grooves 42 according to the third modified example illustrated in FIG. 5(C) are adapted to the engaging grooves employed here. The width b of each engaging groove 42 is set to be as narrow as 2.5 mm, and five front engaging grooves 42f and five rear engaging grooves 42r are included. The engaging grooves 42 have a substantially equal depth d from the bulging surface 41m.

As illustrated in FIG. 6(B), the guide piece 4 does not have to be formed into a shape that protrudes in the thickness direction. If the guide piece 4 is formed into a shape that also protrudes in the thickness direction, the frictional force of the sliding surface 41 may be excessively increased, the guide piece 4 mounted on the vehicle body may occupy more space, and the increased volume may lead to an increase in cost.

The threading hole 3 has a curved portion 33 formed in such a shape that follows the shape of the bulging surface 41m. In other words, the curved portion 33 is curved so as to have substantially the same curvature as the bulging surface 41m. Thus, the curved portion 33 has a certain opening that allows at least the webbing W to be thread therethrough.

By forming the bulging surface 41m, a larger pressing force can be generated between the webbing W and the sliding surface 41, and the webbing W can be more easily engaged with the engaging grooves 42. Thus, deviation (a so-called jamming phenomenon) of the webbing can be further prevented. The webbing-threading member 1 according to this embodiment effectively functions particularly when a vehicle decelerates suddenly such as when a vehicle crashes.

As illustrated in FIG. 6(B), the guide piece 4 according to this embodiment has a grooved portion 36 that is engaged with the core 22, at the back side. The core 22 has a projecting portion 22a, which partially projects sideward, at a substantially center portion. A substantially center portion of the grooved portion 36 is partially enlarged to receive the projecting portion 22a. In this manner, at the time of molding the synthetic resin 23, positioning of the guide piece 4 can be easily performed by engaging the projecting portion 22a with the grooved portion 36 and restraining the guide piece 4 and the core 22 from moving in the vehicle front-rear direction. Note that this structure for engaging the guide piece 4 and the core 22 is merely an example, and the structure of the back side of the guide piece 4 may be the same as that according to the embodiment illustrated in FIG. 1.

Figure 7:
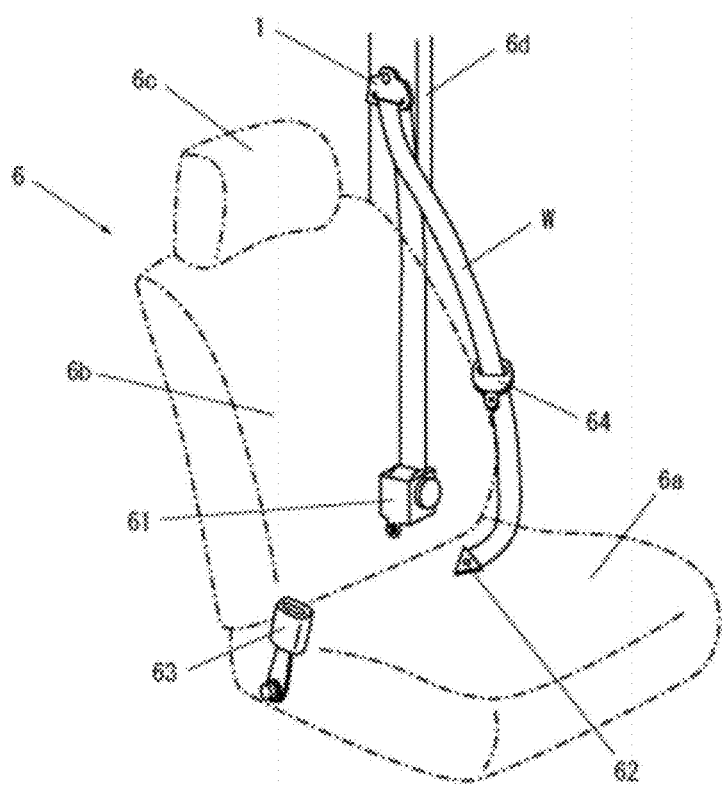
FIG. 7 is a view illustrating the entire structure of a seatbelt device according to the present invention.

Lastly, a seatbelt device according to the present invention will be described. Here, FIG. 7 is a view illustrating the entire structure of a seatbelt device according to the present invention. Components the same as those illustrated in FIG. 1 are denoted by the same symbols and redundant description thereof will not be given.

The seatbelt device according to the present invention illustrated in FIG. 7 includes webbing W used for restraining an occupant in a seat 6, a retractor 61 for retracting the webbing W, a guide anchor (webbing-threading member 1) mounted on a vehicle body for guiding the webbing W, a belt anchor 62 for fixing the webbing W to the vehicle body, a buckle 63 disposed on a side surface of the seat 6, and a tongue 64 through which the webbing W passes. With the seatbelt device, an occupant is restrained with the webbing W by fitting the tongue 64 into the buckle 63. The seatbelt device employs the above-described webbing-threading member 1 according to the present invention as the guide anchor.

The seat 6 includes, for example, a seat portion 6a on which an occupant sits, a backrest portion 6b located to the rear of an occupant, and a headrest portion 6c for supporting a head of an occupant. The refractor 61 is located, for example, inside the backrest portion 6b of the seat 6. Generally, the buckle 63 is often disposed on a side surface of the seat portion 6a and the belt anchor 62 is often disposed on the bottom surface of the seat portion 6a. The guide anchor (webbing-threading member 1) is often mounted on the B-pillar 6d of the vehicle body. One end of the webbing W is joined to the belt anchor 62 and another end is joined to the retractor 61 via the guide anchor (webbing-threading member 1). Thus, when the tongue 64 is to be fitted into the buckle 63, the webbing W is withdrawn from the retractor 61 while sliding through the threading hole 3 of the guide anchor (webbing-threading member 1). When an occupant unfastens the seatbelt in order to get out of the vehicle, the webbing W is retracted by the retractor 61 while sliding through the threading hole 3 of the guide anchor (webbing-threading member 1). Furthermore, when a vehicle crashes or is braked suddenly, an occupant is thrown in a travelling direction due to the inertial force, and thus the webbing W is pulled forward and is likely deviated toward one side in the threading hole 3.

The seatbelt device according to the present invention employs the above-described webbing-threading member 1 of the present invention as the guide anchor. Consequently, a predetermined pressing force can be generated by use of the engaging grooves 42 formed in the guide piece 4, rotation of the webbing-threading member 1 can be prevented, and deviation (a so-called jamming phenomenon) of the webbing W can be prevented. The seatbelt device also has the following effects. Specifically, by forming the engaging grooves 42 so as to include the rear engaging grooves 42r and the front engaging grooves 42f, a pressing force can be effectively generated at the time of withdrawing or retracting the webbing W; by forming the engaging grooves 42 (the rear engaging grooves 42r and the front engaging grooves 42f) in predetermined directions, the webbing W can be more easily engaged with the engaging grooves 42; by setting the engaging grooves 42 to have a predetermined width b, the webbing W can be effectively engaged by being allowed to sag in the engaging grooves 42. The seatbelt device of the present invention can employ, not only the webbing-threading member 1 according to the first embodiment, but also the webbing-threading member 1 including the guide piece 4 having the engaging grooves 42 according to any one of the first to fifth modified embodiments, or the webbing-threading member 1 according to the embodiment illustrated in FIG. 6.

The present invention is not limited to the embodiments described above, and may be modified in various ways within a scope not departing from the gist of the present invention. For example, the present invention may be applied to webbing-threading members 1 or seatbelt devices included in conveyances other than vehicles.

The invention claimed is:

1. A webbing-threading member for guiding webbing used for restraining an occupant of a vehicle, the webbing-threading member comprising:
   a body rotatably mounted on a side of the vehicle;
   a threading hole formed in the body for guiding the webbing; and
   a guide piece placed on a surface of the threading hole and forming a sliding surface over which the webbing slides,
   wherein the guide piece has, on the sliding surface, engaging grooves that cause a force to act in such a direction as to rotate the body toward a vehicle front side at the time of withdrawing the webbing, and that cause a force to act in such a direction as to rotate the body toward a vehicle rear side at the time of retracting the webbing,
   wherein the engaging grooves are formed so that the webbing sags in the engaging grooves without contacting bottom portions of the engaging grooves.

2. The webbing-threading member according to claim 1, wherein the engaging grooves include rear engaging grooves formed in a vehicle-rear-side region of the guide piece and front engaging grooves formed in a vehicle-front-side region of the guide piece, the rear engaging grooves function at the time of withdrawing the webbing, and the front engaging grooves function while the webbing is retracted.

3. The webbing-threading member according to claim 2, wherein the rear engaging grooves extend from a vehicle-body-side surface to an occupant-side surface in a direction from a vehicle rear side toward a vehicle front side, and wherein the direction in which the rear engaging grooves are formed is set in such a manner that the rear engaging grooves form a larger angle with a center line of the guide piece than a direction in which the webbing is guided does.

4. The webbing-threading member according to claim 3, wherein the front engaging grooves are formed to be mirror symmetric to the rear engaging grooves.

5. The webbing-threading member according to claim 1, wherein the sliding surface of the guide piece is formed into a shape that protrudes with respect to a vehicle front-rear direction.

6. A seatbelt device comprising:
   a webbing used for restraining an occupant in a seat;
   a retractor for retracting the webbing;
   a guide anchor mounted on a vehicle body for guiding the webbing;
   a belt anchor for fixing the webbing to the vehicle body;
   a buckle disposed on a side surface of the seat; and
   a tongue through which the webbing passes,
   the seatbelt device restraining the occupant when the tongue is fitted into the buckle, wherein the guide anchor is the webbing-threading member according claim 1.

7. The webbing-threading member according to claim 1, wherein
   the engaging grooves have a width set to be within a range of 2.5 to 4.5 mm, an edge portion having an angle of approximately 90°, and a depth of 0.3 mm or larger, and an areal proportion of a portion of the sliding surface that is occupied by the engaging grooves is 50% or lower.

* * * * *